(12) United States Patent
Yamaguchi

(10) Patent No.: US 6,545,694 B1
(45) Date of Patent: Apr. 8, 2003

(54) THERMAL PRINTER

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/492,539

(22) Filed: Jan. 27, 2000

(30) Foreign Application Priority Data

Jan. 27, 1999 (JP) .......................................... 11-018129
Feb. 8, 1999 (JP) .......................................... 11-030009

(51) Int. Cl.[7] ............................................. G01D 15/10
(52) U.S. Cl. ..................................................... 347/171
(58) Field of Search ................................. 347/172, 174, 347/176, 197, 198, 16, 183; 400/120.17; 358/1.16; 346/134, 76.1; B41I 25/312

(56) References Cited

U.S. PATENT DOCUMENTS

| | | | | |
|---|---|---|---|---|
| 4,638,332 A | * | 1/1987 | Sakura et al. | 347/174 |
| 4,844,632 A | * | 7/1989 | Minowa | 400/120.17 |
| 4,937,592 A | * | 6/1990 | Akao et al. | 346/134 |
| 5,274,395 A | * | 12/1993 | Mizoguchi et al. | 347/183 |
| 5,734,411 A | * | 3/1998 | Michielsen et al. | 347/186 |
| 5,971,519 A | * | 10/1999 | Horikoshi | 347/16 |
| 6,078,345 A | * | 6/2000 | Yamakawa et al. | 347/218 |
| 6,081,342 A | * | 6/2000 | Nakai et al. | 358/1.16 |
| 6,210,053 B1 | * | 4/2001 | Suzuki et al. | 347/176 |

FOREIGN PATENT DOCUMENTS

| JP | 1-102544 | 4/1989 | .......... G03B/42/02 |
|---|---|---|---|
| JP | 1-309053 | 12/1989 | |
| JP | 2-83543 | 3/1990 | .......... G03C/3/00 |
| JP | 5-16400 | 1/1993 | .......... B41J/2/325 |
| JP | 6-270443 | 9/1994 | .......... B41J/2/335 |
| JP | 10-166640 | 6/1998 | .......... B41J/2/36 |

* cited by examiner

Primary Examiner—Lamson Nguyen
Assistant Examiner—K. Feggins
(74) Attorney, Agent, or Firm—Sughrue Mion, PLLC

(57) ABSTRACT

The thermal printer includes a thermal recording head for recording an image in contact with thermal recording material at a predetermined pressure and a platen roller that is arranged to face the thermal recording head and supports the thermal recording material that becomes an object to be recorded, wherein the thermal recording head records a monochromic image and a color image in a direct recording system. The thermal printer includes the thermal recording head and a plurality of kinds of thermal recording material transport units, for example, the platen roller and a capstan roller for transporting the thermal recording material; wherein a different unit is used among the plurality of kinds of thermal recording material transport units when the monochromic image is recorded and when the color image is recorded. The thermal printer can output the monochromic image and the color image without any troublesome operation such as replacing ink ribbons and loading/unloading ink ribbons or can not generate a non-recorded region in case of the monochromic image.

20 Claims, 9 Drawing Sheets

THERMAL PRINTER

BACKGROUND OF THE INVENTION

The present invention relates to a thermal printer and more particularly to a thermal printer that outputs a monochromic (black and white) image and a color image onto a thermal recording material such as a film or a recording paper in a clear form by a simple operation.

The image recording (thermal image recording) with thermal recording material such as thermal film is utilized in recording an image for an ultrasonic wave diagnosis or the like. Also, recently, in view of advantages that any wet type process is unnecessary and handling is easy, the above-described thermal image recording is putting into practice not only for a recording of a small size image such as an ultrasonic wave diagnosis but also for an MRI (magnetic resonance imaging) diagnosis, for a medical diagnosis that needs a large size image such as an X-ray diagnosis or the like.

As is well known, for the thermal image recording, by using a thermal head in which heat-generating elements for heating the thermal recording material imagewise to thereby record the image are arranged in one direction, the thermal head and the thermal recording material are moved relative to each other in a direction perpendicular to the arrangement direction of the heat-generating elements to thereby perform the image recording. In the thermal image recording, it should be noted that energy is fed to each heat-generating element of the thermal head on the basis of an image signal to heat each heat-generating element imagewise to thereby perform the image recording.

The known thermal image recording systems are categorized basically into two types, i.e., a direct thermal recording (direct thermal print) for recording an image by using the thermal recording material including a monochromic or multicolor thermal coloring material and a transfer recording system using an ink ribbon or the like for the monochromic or multicolor transfer recording. Various kinds of specific system are put into practice for each recording system.

By the way, the monochromic image has been still mainly utilized for the medical image by the above-described thermal recording and the amount of the output is large. However, a color image is utilized for an ultrasonic wave color Doppler blood flow photographic image out of the medical images or a part of the medical images such as three-dimensional images of various CTs (Computer Tomography).

Therefore, in the conventional thermal printer, in order to obtain both monochromic image and color image, the following systems have been adopted:

(1) a system in which both monochromic image and color image are recorded by a transfer recording system such as a sublimation transfer system or the like and ink ribbons are replaced in accordance with the monochromic image or the color image; and (2) a system in which the monochromic image is recorded by a direct recording system such as a direct thermal print system, whereas the color image is recorded by the transfer recording system such as the sublimation transfer system, and only in the color image recording, the ink ribbon is loaded.

However, in such a system in which the ink ribbons are replaced or in which the ink ribbon is loaded/unloaded, in the case where the monochromic image recording and the color image recording are frequently switched, the replacement of the ink ribbons, the operation of loading/unloading are frequently required so that the operation becomes complicated.

Furthermore, in the conventional thermal printer, to obtain a color image, since it is necessary to activate at least three colors such as cyan (C), magenta (M) and yellow (Y), it is necessary to perform the image forming process at least three times on a single piece of the thermal recording material without any positional displacement. For this reason, it is necessary to reciprocatingly move the thermal recording material, but it is necessary to align the recording start position of the thermal recording material in place for every image forming process. To this end, a transport roller pair having a function of a capstan roller is provided downstream of a platen roller in confronting relation with a thermal head, and the thermal recording material is clamped by the transport roller pair normally during the recording operation to thereby control the transport amount thereof. As a result, in the color image recording, it is unavoidable to produce the portion of the thermal recording material where the print is impossible.

For this reason, in the case where the monochromic image and the color image are obtained in the conventional thermal printer, in a print where the monochromic image is formed on a transparent film as in the X-ray diagnosis image, not only non-recorded region where no image is formed is wasted but also in the case where the image is observed by a back light such as a sharkasuten, the back light comes directly through the non-recorded region, resulting in hindrance in medical diagnosis.

Furthermore, recently, a so-called total medical system in which various medical inspection devices, processing devices for processing the data and images, a display unit for outputting the processed data and image to a predetermined output device, a printer and the like are mutually connected to each other has been realized. In such a system, since a plurality of medical inspection devices, a plurality of processing devices and a plurality of output devices are used, in order to output the image, it is very troublesome to recognize which output device is available (or which output device should be selected) depending upon the fact that the image is monochromic or colorful.

In the case where the above-described monochromic image recording and color image recording should be performed with a single thermal printer, the following points may be noticed. Namely, in case of the monochromic image, it is possible to obtain the image through the image forming process only through one operation, whereas in case of the color image, normally, the image forming process is required at least three times.

This is because, in order to obtain the color image, since at least three kinds of color layers of cyan (C), magenta (M) and yellow (Y) are used, these are to be processed for imaging under the independent conditions. The important thing in this case is that the positional displacement of the image should be avoided among three image forming processes.

For this reason, in the conventional thermal printer, in the case where the color image is to be formed, the capstan roller for transporting the thermal recording material is disposed behind the platen roller (on the downstream side). When the thermal recording material for the color image formation is reciprocatingly moved by the capstan roller, the image forming process is performed during the transport in one direction so that the positional displacement of the images is avoided while the thermal recording material is caused to face the thermal head three times to perform the three image forming processes.

The problem in such a system thus constructed is that a portion where the image could not formed corresponding to a distance between the platen roller and the capstan roller is generated at the leading edge portion of the thermal recording material. This is unavoidable in the case where it is necessary to reciprocatingly move the thermal recording material as in obtaining the color image. However, in the case where the monochromic image is obtained and the reciprocation as for the color image is not necessary for the monochromic image, there is a problem that the thermal recording material is apparently wasted.

Furthermore, in many cases, the monochromic image with the non-recorded portion is recorded on a transparent film such as an X-ray diagnosis image. Also, in many cases, the film is observed through a sharkasuten. Therefore, a ray of bright light of the sharkasuten comes through the film upon observation. Thus, there is a problem that not only the observer feels a shiny ray but also the ray hinders the reading of the shade (diagnosis).

SUMMARY OF THE INVENTION

The present invention has been made in view of the foregoing circumstances, in order to overcome the above-described problems inherent in the prior art, a primary object of the present invention is to provide a thermal printer that can output a monochromic image and a color image without any troublesome operation such as replacing ink ribbons and loading/unloading ink ribbons and more preferably can not generate a non-recorded region in case of the monochromic image.

The present invention has been made in view of the foregoing circumstances, in order to overcome the above-noted problems inherent in the prior art, a secondary object of the present invention is to provide a thermal printer in which the thermal recording material transport units are changed for the case of obtaining the monochromic image or for the case of obtaining the color image so that the non-recorded portion generated in the case of obtaining the monochromic image can be reduced as much as possible.

In order to attain the first object described above, the first aspect of the present invention provides a thermal printer comprising: a thermal recording head for recording an image in contact with thermal recording material at a predetermined pressure; and a platen roller that is arranged to face the thermal recording head and supports the thermal recording material that becomes an object to be recorded; wherein the thermal recording head records a monochromic image and a color image in a direct recording system.

It is preferable that the thermal recording material includes monochromic thermal recording material for recording the monochromic image and color thermal recording material for recording the color image and the thermal recording head records the monochromic image onto the monochromic recording material and the color image onto the color thermal recording material, respectively.

The thermal printer of the present invention further comprises a recording material feeding section for feeding the thermal recording material; and a judgment unit provided in the recording material feeding section for judging whether the thermal recording material is monochromic thermal recording material for recording the monochromic image or color thermal recording material for recording the color image.

The thermal printer of the present invention further comprises at least two recording material feeding sections of a first recording material feeding section for feeding monochromic thermal recording material for recording that monochromic image; and a second recording material feeding section for feeding color thermal recording material for recording the color image.

It is also preferable that, in the thermal printer of the present invention, the monochromic image is recorded on a transparent recording medium that is monochromic thermal recording material and the color image is recorded on a reflective recording medium that is color thermal recording material.

It is further preferable that a head pressure for depressing the thermal recording material at the predetermined pressure is changed by the thermal recording head when the monochromic image is recorded and when the color image is recorded.

The thermal printer of the present invention further comprises a plurality of kinds of thermal recording material transport units for transporting the thermal recording material; wherein a different unit is used among the plurality of kinds of thermal recording material transport units when the monochromic image is recorded and when the color image is recorded.

The thermal printer of the present invention further comprises an identification unit for identifying designated information from an external device for designating distinction as to whether the image to be recorded is the monochromic image or the color image.

The thermal printer of the present invention further comprises a designation unit for designating distinction as to whether the image to be recorded is the monochromic image or the color image.

It is also further preferable that the thermal recording material comprises monochromic thermal recording material including a heat responsible microcapsule in a color forming layer.

It is still further preferable that the monochromic image and the color image are medical inspection images.

The present invention provides a thermal printer comprising: a thermal recording head for recording an image in contact with thermal recording material at a predetermined pressure; and a platen roller that is arranged to face the thermal recording head and supports the thermal recording material that becomes an object to be recorded; wherein a head pressure of that thermal recording head for depressing that thermal recording material at the predetermined pressure is changed in accordance with a kind of that thermal recording material.

It is preferable that the thermal recording material includes monochromic thermal recording material for recording the monochromic image and color thermal recording material for recording the color image and the thermal recording head records the monochromic image onto the monochromic recording material and the color image onto the color thermal recording material, respectively.

In order to attain the second object described above, the second aspect of the present invention provides a thermal printer comprising: a thermal recording head for recording an image in contact with thermal recording material at a predetermined pressure; and a plurality of kinds of thermal recording material transport units for transporting the thermal recording material; wherein a different unit is used among the plurality of kinds of thermal recording material transport units when that monochromic image is recorded and when the color image is recorded.

It is preferable that one of the plurality of kinds of thermal recording material transport units is disposed to face the thermal recording head and is a platen roller for supporting the thermal recording material that becomes an object to be recorded, and the other is a capstan roller disposed behind the thermal recording head and the platen roller.

It is also preferable that a head pressure for depressing the thermal recording material at the predetermined pressure is changed by the thermal recording head when the monochromic image is recorded and when the color image is recorded.

The thermal printer of the present invention further comprises an identification unit for identifying designated information from an external device for designating distinction as to whether the image to be recorded is the monochromic image or the color image.

The thermal printer of the present invention further comprises a designation unit for designating distinction as to whether the image to be recorded is the monochromic image or the color image.

It is further preferable that the monochromic image and the color image are medical inspection images.

DETAILED DESCRIPTION OF THE INVENTION

A thermal printer in accordance with a preferred embodiment of the invention will now be described in detail with reference to the accompanying drawings.

Figure 1:
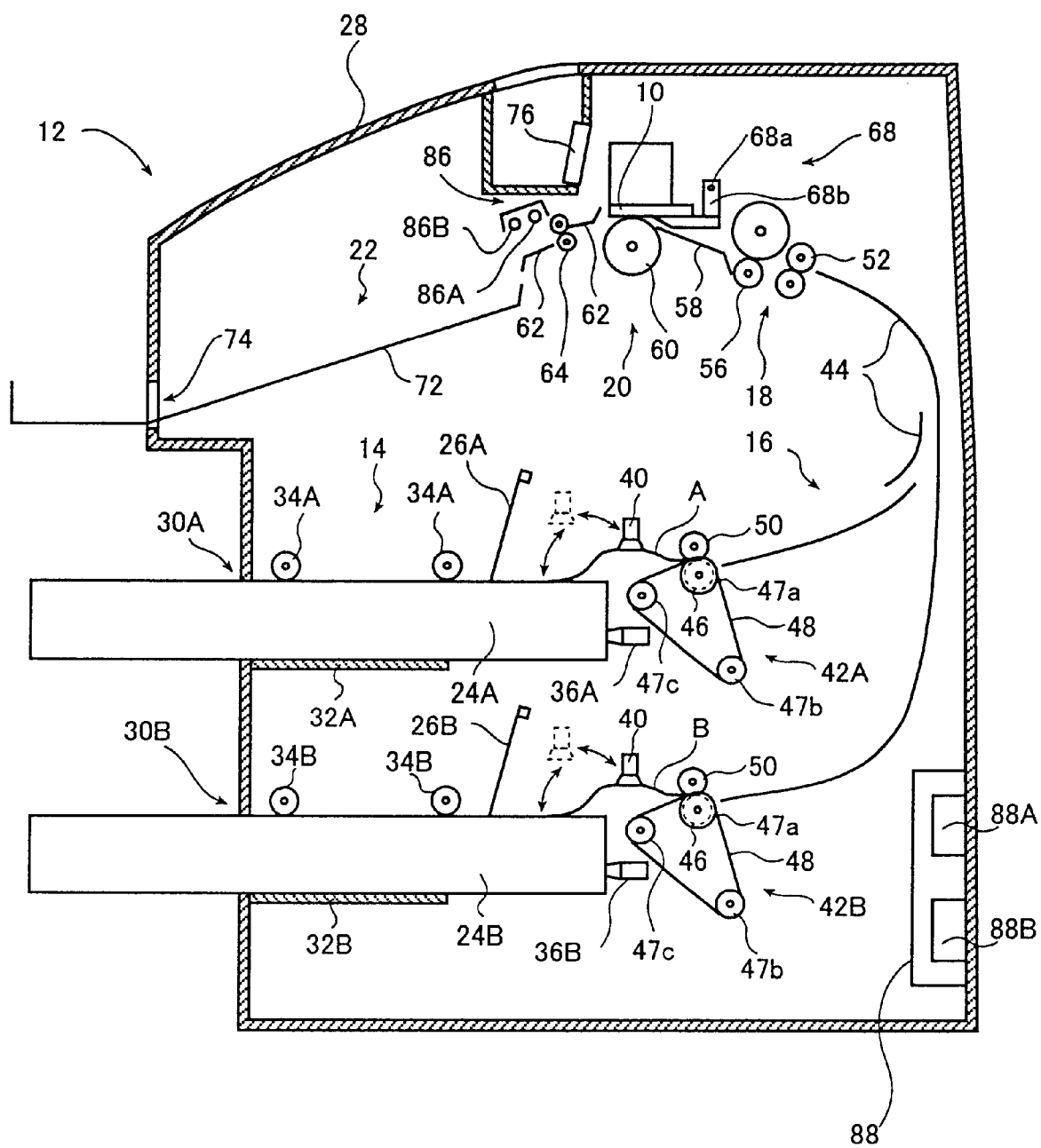
FIG. 1 is a schematic cross-sectional view of a thermal printer in accordance with an embodiment of the invention.

FIG. 1 is a schematic cross-sectional view showing a thermal printer in accordance with a first embodiment of the present invention. The thermal printer 12 shown in FIG. 1 performs a thermal image recording onto thermal recording materials A and B which are different from each other with one thermal head 10 by using cut sheets of the thermal recording materials A and B having predetermined sizes, and includes a loading section 14, a feed and transport section 16, a recording transport section 18 and is provided with a recording section 20a having thermal head pressure support portion 68 for uniformly pressing against a platen roller 60 to be described later with a suitable pressure and supporting the above-described thermal head 10 and a discharge section 22.

In the thermal printer 12 in accordance with the embodiment, it is assumed that the thermal recording material A is a thermal recording material for a monochromic image used for recording an ultrasonic wave diagnosis image or an X-ray diagnosis image such as a monochromic film to be described later, and the thermal recording material B is a thermal recording material for a color image used for recording a reference image or a three dimensional image of CT such as a color paper to be described later. The thermal recording material A and the thermal recording material B will hereinafter be referred to monochromic film and color paper, respectively.

A number of pieces of the above-described monochromic film A and color paper B are laminated and received within magazines 24A and 24B with the thermal recording layers facing down, respectively. The magazines 24A and 24B are boxes having cover members 26A and 26B, respectively, and are to be loaded into the loading section 14 of the thermal printer 12.

The loading section 14 has insertion inlets 30A and 30B and guide plates 32A and 32B formed in a housing 28 of the thermal printer 12, guide rollers 34A and 34B and stop members 36A and 36B. The magazines 24A and 24B are inserted from the insertion inlets 30A and 30B into the housing 28 of the thermal printer 12 with the cover members 26A and 26B forward and pressed up to positions in contact with the stop members 36A and 36B while being guided by the guide plates 32A and 32B and the guide rollers 34A and 34B, to be loaded into predetermined positions of the thermal printer 12.

The feed and transport section 16 has sheet feeding mechanisms having suckers 40, transport units 42A and 42B and transport guides 44 for picking up the monochromic film A and color paper B from the magazines 24A and 24B and transporting them to the recording transport section 18 on the downstream side in the transport direction. The transport units 42A and 42B are composed of transport rollers 46, pulleys 47a coaxially provided with the transport rollers 46, pulleys 47b connected to a rotary drive source, tension pulleys 47c, endless belts 48 laid around these three pulleys and nip rollers 50 to be depressed against the transport rollers 46 for transporting the monochromic film A or the color paper B, sucked by the suckers 40, on the downstream side from the magazines 24A and 24B while leading edges thereof being clamped by the transport rollers 46 and the nip rollers 50.

In the thermal printer 12 in accordance with the embodiment, under the condition that the thermal recording material to be used is designated, i.e., either monochromic film A or color paper B is designated, upon the command of starting the recording operation, the cover member 26A or 26B of the magazine 24A or 24B corresponding to the designated thermal recording material is opened by an open/close mechanism (not shown). The sheet feeding mechanism using the sucker 40 feeds the leading edge of the designated thermal recording material to the transport units 42A or 42B (transport roller 46 and nip roller 50).

The thermal recording material fed to the transport units 42A or 42B is transported to the recording transport section 18 by the transport units 42A or 42B while being guided by the transport guide 44. Incidentally, at the time when the thermal recording material is clamped by the transport roller 46 and the nip roller 50, the suction of the thermal recording material by the suckers 40 is released. Also, at the time when the thermal recording material to be fed for recording is discharged from the magazine 24A or 24B, the cover member 26A or 26B of the magazine 24A or 24B is closed by the above-described open/close mechanism.

The recording transport section 18 has a regulating roller pair 52, a transport roller pair 56 and a guide 58. First of all, the leading edge of the thermal recording material to be transported by the transport units 42A or 42B reaches the regulating roller pair 52. Here, the distance from the transport units 42A and 42B to the regulating roller pair 52 defined by the transport guide 44 is set to be somewhat shorter than a length in the transport direction of the thermal recording material. At first, the regulating roller pair 52 stops. When the leading edge of the thermal recording material has reached the regulating roller pair 52, a temperature of the thermal head 10 is confirmed. If the temperature of the thermal head 10 reaches a predetermined temperature, the transport of the thermal recording material by the regulating roller pair 52 is started (which will be described in more detail later). Then, the thermal recording material is transported to the recording section 20 while being guided by the guide 58.

The recording section 20 has the thermal head 10, the platen roller 60, a pressure support portion 68 of the thermal head 10 for supporting the thermal head 10 and pressing against the platen roller 60, a guide 62, a transport roller pair 64 (capstan roller 64A and pressure roller 64B) rotating in synchronization with the platen roller 60, a cooling fan 76 (to be described in detail later). The thermal head 10 is supported by a head fixture arm 68b rotatable relative to a pivot shaft 68a of the thermal head pressure support portion 68. The above-described head fixture arm 68b is rotated to a position where the thermal head 10 is out of contact of the platen roller 60 before the thermal recording material is transported.

When the leading edge of the thermal recording material has been transported to the recording start position (the position corresponding to the glaze of the thermal head 10) by the recording transport section 18, the head fixture arm 68b is rotated so that the thermal recording material is clamped between the thermal head 10 and the platen roller 60 and at the same time, the thermal head 10 uniformly depresses the thermal recording material on the platen roller 60 at a predetermined pressure over its entire length by the pressure support portion 68.

As described above, the monochromic film A such as an X-ray diagnosis image or the like is observed by using a back light such as a "Schaukasten". For this reason, the transparent film for the monochromic image requires hardness, i.e., rigidity to some extent in order to enhance the handling property when the film is applied to the "Schaukasten" or the like. In general, a polyethylene terephthalate (PET) film that is about 175 micron meters thick and transparent is used for the base material. On the other hand, a coated paper that is not transparent and thinner than 175 micron meters described above is used for color reflective paper such as color paper B or the like.

The pressure for depressing the thermal recording material to the thermal head 10 has to be set higher in case of the monochromic film A that has rigidity to some extent. However, in some cases, this high pressure would become excessive for the color paper B and there would be a disadvantage that a curl after the recording operation would become remarkable. Inversely, if the pressure is optimized for the color paper B, the pressure would be insufficient for the monochromic film A and the contact against the thermal head 10 would be unstable so that printing faults such as fog would be generated.

Accordingly, it is preferable that the pressure is changed for the monochromic image recording on the monochromic film A and the color image recording on the color paper B. More specifically, it is preferable that the pressure is set somewhat lower for the color image recording onto the color paper B.

Thus, the thermal recording material is subjected to the thermal image recording process by the thermal head 10 while being transported on the downstream side and kept at the predetermined position relative to the thermal head 10 by the platen roller 60. Incidentally, the thermal image recording process by the thermal head 10 will be described in more detail separately for the monochromic/color images later.

The thermal recording material that has been subjected to the thermal image recording process is transported and discharged to a tray 72 of the discharge section 22 by the platen roller 60 and the transport roller pair 64 (capstan roller 64A and pressure roller 64B) while being guided by a guide 62. The tray 72 projects to the outside of the thermal printer 12 through a discharge outlet 74 formed in the housing 28 of the thermal printer 12 in accordance with the embodiment and the thermal recording material on which the image has been recorded is discharged to the outside through the discharge outlet 74 and picked up.

The thermal image recording (which will hereinafter simply be referred to as the image recording) process will now be described in detail.

First of all, the image recording on the monochromic film A will be described. Such image recording is used in, for example, recording a diagnosis image in ultrasonic wave diagnosis.

For such an image recording, the thermal recording material (for example, the thermal recording material disclosed in Japanese Patent Application Laid-Open No. Hei 10-166640) that has a thermal recording layer in which color forming agent and pigment are contained in microcapsules and dispersed in binder may be used as the thermal recording material for the monochromic image. This thermal recording material is a thermal recording material (which will hereinafter simply be referred to as the monochromic film A) in which, resin film or paper (for example, transparent PET film is used here as an example) is used as a base material and the above-described thermal recording layer is formed on one surface thereof.

By the way, in the case where the image is diagnosed in accordance with a gradation of the black and white colors (monochrome) as in the X-ray diagnosis image, in order to enhance the visibility of difference in fine gradation, it is necessary to observe the transparent image having a wide dynamic range by using a back light ("Schaukasten"). For this reason, as described above, it is preferable that transparent film such as PET is used as a base material and the image is recorded on a transparent recording medium such as monochromic film A in which the thermal recording layer is formed on its surface, thereby outputting it as the transparent image.

Figure 2:
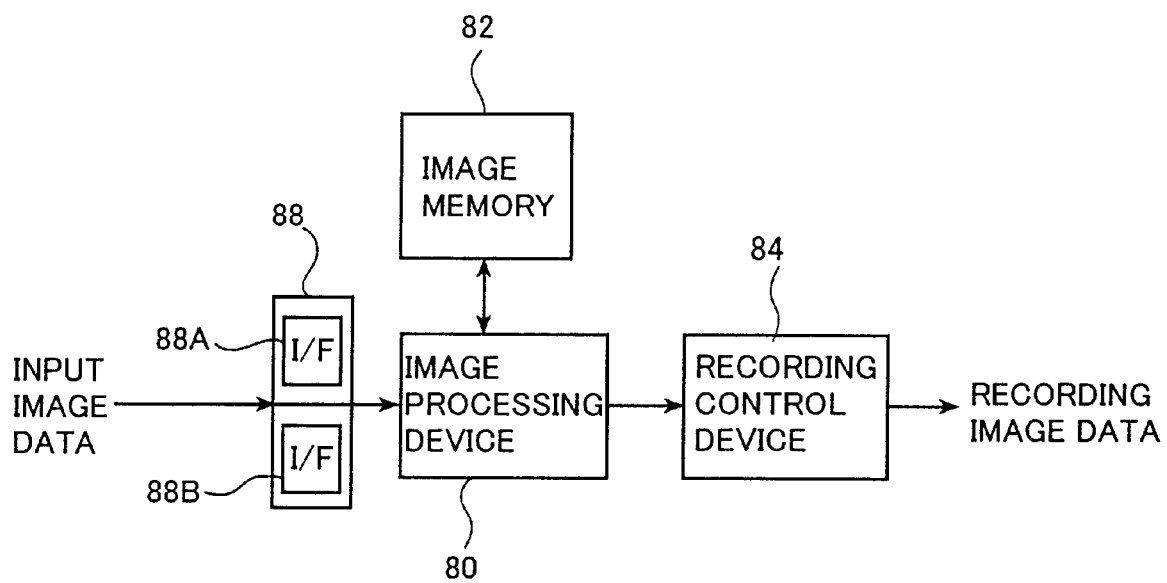
FIG. 2 is a block diagram showing schematic structure of an embodiment of a recording control system for a thermal head of the thermal printer shown in FIG. 1 in accordance with an embodiment of the invention.

The image recording to the above-described monochromic film A is performed by using the thermal head 10 for the image recording of the record (pixel) density of about 300 dpi at which the recording is possible up to, for example, B4 size at maximum. As shown in FIG. 2, the recording control system of the thermal head 10 is basically composed of an image processing device 80, an image memory 82 and a recording control unit 84. The image data from the image data feed source such as the above-described CT or MRI are fed to the image processing device 80 that is composed of various image processing circuits and memories through an input interface (I/F) 88 (88A and 88B).

After the image data have been formatted (enlargement, reduction, frame assignment) by a processing portion (not shown) within the image processing device 80 as desired, the image data are compensated for in order to obtain a suitable image. Subsequently, the image data are converted into image data for thermal recording by the thermal head 10 and outputted to the image memory 82. The recording control device 84 reads out the image data stored in the image memory 82 in order line by line in the main scanning direction, and outputs the data to the thermal head 10 as an image signal (voltage application time corresponding to the image) modulated in response to the read image data for thermal recording.

Each recording point of the thermal head 10 is heated in response to the above-described image signal to perform the image recording while transporting the monochromic film A by the platen roller 60 and the like. The monochromic film A that has been subjected to the image recording is transported to the platen roller 60 or further to the transport roller pair 64 while being guided by the guide 62 and discharged to the tray 72 of the discharge portion 22.

The image recording process on the monochromic film A has been thus far described.

On the other hand, in the case where the color image is recorded on the color recording paper, for example, it is possible to use the thermal recording material having the thermal recording layers corresponding to the three colors as described above (the thermal recording material disclosed in, for example, Japanese Patent Application Laid-Open No. Hei 5-16400). The thermal recording material is color thermal recording material in which the heat sensitivity is higher toward the upper layer, and three thermal color forming layers generating different colors by heating and a transparent protective layer located on the uppermost thermal color forming layer are formed on a base material such as opaque coated paper (which will hereinafter simply be referred to as the color paper B).

By the way, since the judgment or identification according to a color is possible for the color image, it is unnecessary to make a diagnosis for the image according to a difference in fine gradation as for the monochromic image. Accordingly, it is sufficient to make a judgment with the reflective image in the room light. For this reason, it is preferable to record the color image on the reflective recording medium such as the color recording paper (color paper B) in which at least three thermal color forming layers and the transparent protective layer are formed on the opaque base material such as coated paper as described above and to output the image in the form of the reflective image.

In the case where the color thermal print is to be performed by using the color paper B, the difference from the case of the above-described image recording process onto the monochromic film A is as follows. Namely, first of all, it is possible to point out as a primary difference that an optically fixing process is performed for the thermal color forming layers that have been subjected to the color forming process, during the color forming process in which the three thermal color forming layers are caused to generate the colors in order. Secondly, in the case where the thermal printer shown in FIG. 1 is to be used, since the color paper B has to be reciprocatingly moved plural times, it is necessary to perform the positional alignment during the reciprocating movement. Furthermore, as described above, in case of the color thermal print, it is desirable that the pressure for depressing the color paper B is set to be lower in comparison with the monochromic thermal print.

Figure 3:
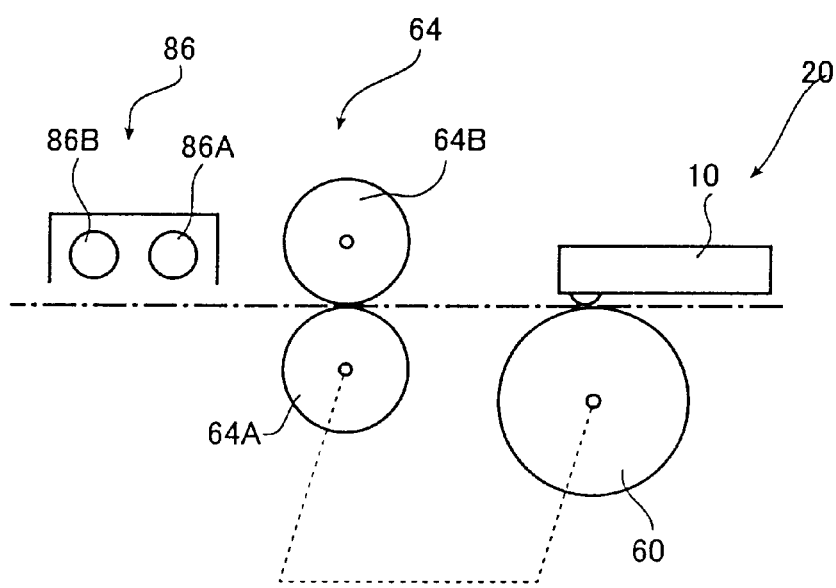
FIG. 3 is a schematic cross-sectional view showing detailed structure of a recording section of the thermal printer shown in FIG. 1.
Figure 4:
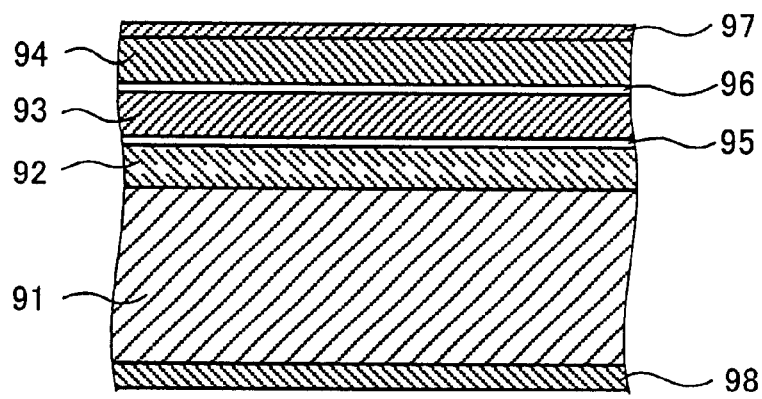
FIG. 4 is a schematic cross-sectional view showing an example of the structure of a piece of a color paper used in the thermal printer shown in FIG. 1.

The optically fixing process is carried out by an optically fixing section 86 provided with fixing light sources 86A and 86B as shown in detail in the recording section 20 of FIG. 3. The color paper B to be used here has the structure as shown in FIG. 4. Namely, a cyan thermal color forming layer 92, a magenta thermal color forming layer 93, a yellow thermal color forming layer 94 and a transparent protective layer 97 are formed in order on a base material 91. The respective color forming layers generate cyan (C), magenta (M) and yellow (Y) in accordance with the heat. Incidentally, a layer 95 and a layer 96 are intermediate layers that are provided for the purpose of clarifying the difference in thermal sensitivity of the thermal color forming layers 92, 93 and 94 and ensuring the selective color recording of the respective thermal color forming layers 92, 93 and 94. Reference numeral 98 denotes a backing layer.

Figure 5:
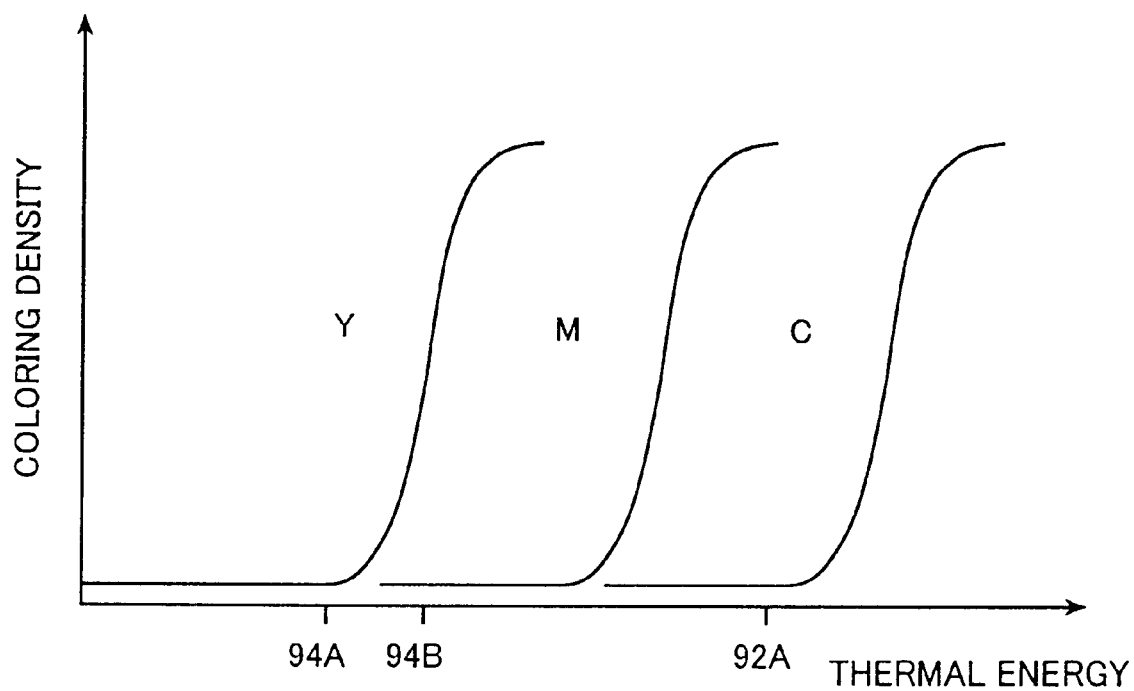
FIG. 5 is a graph showing an example of a color forming characteristic of each thermal color forming layer of the color paper shown in FIG. 4.

FIG. 5 shows color forming characteristics of the respective thermal color forming layers. The thermal sensitivity of the yellow thermal color forming layer 94 is the highest, and the color is generated by a small amount of heat energy. The thermal sensitivity of the cyan thermal color forming layer 92 is the lowest and a large amount of heat energy is required. On the basis of the difference in heat sensitivity, the image recording process is performed in order from the thermal color forming layer that has the higher heat sensitivity.

In FIG. 5, 94A denotes the thermal energy immediately before the color generation of the yellow thermal color forming layer 94 and 94B denotes the thermal energy that causes the yellow thermal color forming layer 94 to generate the color (yellow) in an intermediate density. Also, 92A denotes the thermal energy immediately before the color generation of the cyan thermal color forming layer 92.

Also, the optically fixing process of the yellow thermal color forming layer 94 in the optically fixing section 86 is to be performed by using a yellow ultraviolet ray lamp 86A for emitting an ultraviolet ray having a light emission peak in a wavelength range of 420 nm, and the optically fixing process of the magenta thermal color forming layer 93 is to be performed by using a magenta ultraviolet ray lamp 86B for emitting an ultraviolet ray having a light emission peak in a wavelength range of 365 nm. These yellow ultraviolet ray lamp 86A and magenta ultraviolet ray lamp 86B are arranged in order on the downstream side of the thermal head 10 as shown in FIG. 3. Then, the optically fixing process by the fixing light sources 86A and 86B of the optically fixing section 86 and the image recording by the thermal head 10 are alternatively repeated for the color paper B as described later.

In the thermal printer 12 according to this embodiment, the image recording process to the color paper B is also carried out by using the above-described thermal head 10. Incidentally, it is preferable to perform the conversion process of the image data at a suitable magnification in the case where the recording density for the monochromic image and the recording density for the color image are different from each other. In general, in many cases, the recording density for the monochromic image and the recording density for the color image are different from each other. Therefore, it is preferable to compensate for this difference by the conversion process of the image data in a manner such as addition of the dummy data to the image data that have a rougher recording density. Also, in this embodiment, this kind of data conversion process is carried out.

When the image recording process to the color paper B is designated, in the same manner as in the case of the image recording process to the monochromic film A, the color paper B which is the corresponding medium is fed to the recording transport section 18. The color paper B is transported by the transport unit 42B with its leading edge reaching the regulating roller pair 52. If the temperature of the thermal head 10 is kept at a predetermined temperature, the transport of the color paper B by the regulating roller pair 52 is started, and the paper is fed to the recording section 20. When the leading edge of the color paper B is transported to the recording start position, the image recording process is performed by the thermal head 10 while the paper is held at a predetermined position corresponding to the thermal head 10 and transported on the downstream side by the platen roller 60 and the transport roller pair 64.

The description of the image recording process is to be continued assuming that the recording section 20 shown in FIG. 3 is used. One of the above-described transport roller pair 64 functions as a so-called capstan roller 64A and the other functions as a pressure roller 64B. The rollers are rotated in synchronization with the platen roller 60 to perform the forward movement (transport in the downstream direction) and reverse movement (transport in the upstream direction) of the color paper B. Namely, the transport roller pair 64 performs the forward transport for the image recording process of the color paper B and the subsequent optically fixing process and performs the reverse transport for the image recording process and the optically fixing process for the next color and returning the paper back to the image recording start position. In this case, the positional alignment upon the image recording process for each color, i.e., the positional alignment at the recording start position is controlled by the capstan roller 64A of the transport roller pair 64.

The image recording process to the color paper B is performed in order of the image recording process to the yellow thermal color forming layer 94, the optically fixing process of the yellow thermal color forming layer 94, the image recording process to the magenta thermal color forming layer 93, the optically fixing process of the magenta thermal color forming layer 93 and the image recording process to the cyan thermal color forming layer 92.

In the meantime, the image recording process and the optically fixing process are effected onto the color paper B during the transport in the downstream direction by the above-described transport roller pair 64, the paper is inverted and transported in the upstream direction and the positioning operation for the image recording process and the optically fixing process for the next color are performed. Incidentally, during the image recording process, the positional alignment of the image recording position in the meantime is realized by transporting the color paper B always in a constant direction (i.e., in the downstream direction) while particularly controlling the feed amount by the capstan roller 64A.

The color paper B that has been subjected to the image recording process is transported by the platen roller 60 and the transport roller pair 64 while being guided by the guide 62 and discharged to the tray 72 of the discharge section 22.

The image recording process onto the color paper B has been thus far described.

In accordance with the foregoing embodiment, since the monochromic image and the color image may be recorded in a direct recording method, it is advantageous to provide a thermal printer that may output the monochromic image and the color image without any troublesome operation such as replacement and loading/unloading of the ink ribbons.

By the way, in a second embodiment of the present invention, it is preferable that a plurality of transport units of the thermal recording material upon recording are prepared and different thermal recording material transport units are used for the recording process of the monochromic image and the recording process of the color image. Namely, in this embodiment, preferably, during the recording process for the monochromic image, a so-called platen drive for transporting the thermal recording material, i.e., the monochromic film A by the platen roller 60 is performed in order to obviate the generation of the non-recorded region or reduced it as much as possible, whereas during the recording process for the color image, a so-called capstan drive for controlling and transporting the thermal recording material, i.e., the color paper B by the transport roller pair 64, particularly by the capstan roller 64A is performed in order to obviate the positional displacement in the three-time repeated image recording processes or to suppress it as much as possible.

Thus, in the case where the thermal recording material transport units are changed during the image recording process for the monochromic image and the color image, it is preferable to rotate and control the transport roller pair 64, composed of the capstan roller 64A and the pressure roller 64B, not in synchronization with the platen roller 60 to rotate but separately from the platen roller 60.

The platen drive for transporting the monochromic film A by the platen roller 60 will first be described.

A sequence of the transport and the image recording process for the monochromic film A in the above-described image recording operation onto the monochromic film A will now be described with reference to FIGS. 6A to 6D.

Figure 6A:
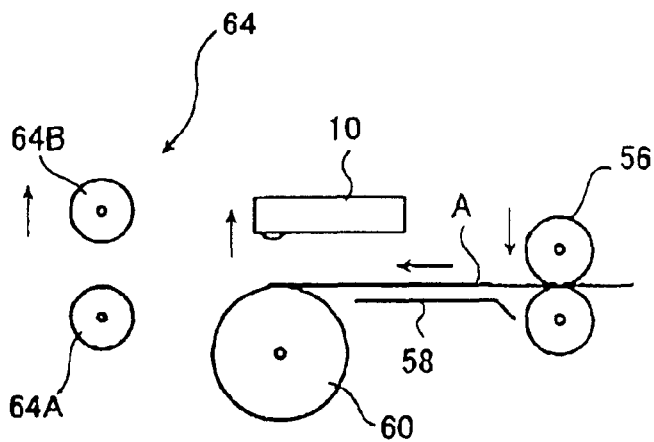
FIGS. 6A to 6D are schematic cross-sectional views showing an example of a sequence of an image recording operation to a monochromic film by the thermal printer shown in FIG. 1, respectively.
Figure 6B:
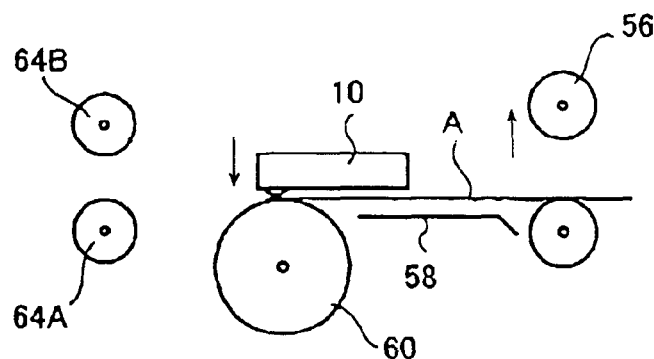

FIG. 6A shows the state in which the monochromic film A is transported to the recording section 20 by the transport roller pair 56, the guide 58 and the like. When the monochromic film A reaches the image recording start position, as shown in FIG. 6B, the thermal head 10 is pressed against the platen roller 60 and the clamp of the film by the transport roller pair 56 is released to thereby complete the recording preparation. Subsequently, although the recording process is started, in this case, the monochromic film A is subjected to the image recording process while being transported by the platen roller 60 as shown in FIG. 6C.

Figure 6C:
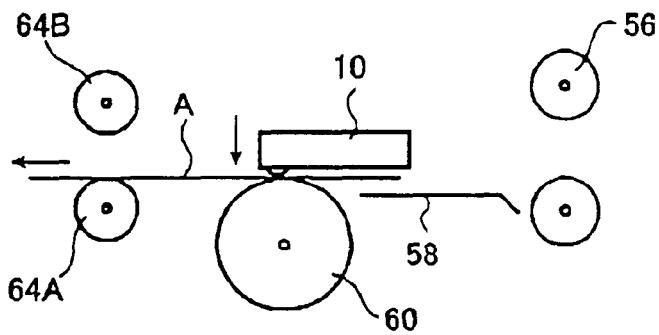
Figure 6D:
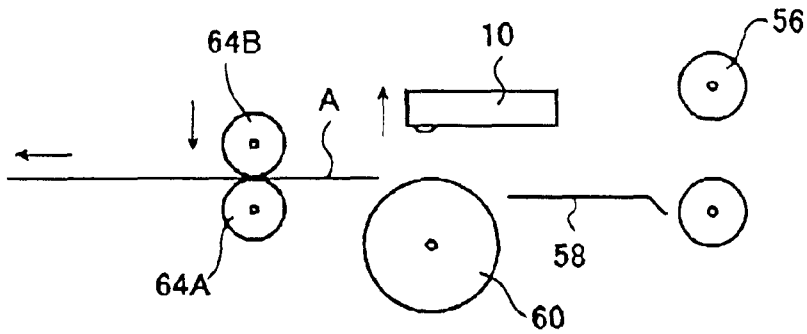

As shown in FIG. 6C, during the image recording process onto the monochromic film A, the transport roller pair 64 do not clamp the monochromic film A and the pressure roller 64B is retracted to a position away from the capstan roller 64A. When the image recording process has been completed, the pressure roller 64B is returned back to a position in pressing contact with the capstan roller 64A. As shown in FIG. 6D, the monochromic film A that has been subjected to the image recording process is transported in the direction for discharging the monochromic film A.

The image recording process for the monochromic film A has been thus described.

The capstan drive for controlling and transporting the color paper B by the transport roller pair 64, particularly by the capstan roller 64A will now be described.

A sequence of the transport, the image recording process and the optically fixing operation for the color paper B in the above-described image recording process onto the color paper B will now be described with reference to FIGS. 7A to 7F.

Figure 7A:
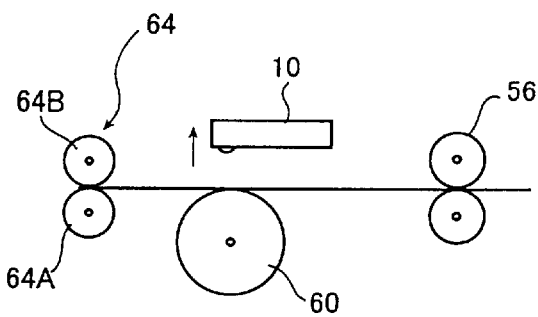
FIGS. 7A to 7F are schematic cross-sectional views showing an example of a sequence of an image recording operation to a color paper by the thermal printer shown in FIG. 1, respectively.
Figure 7B:
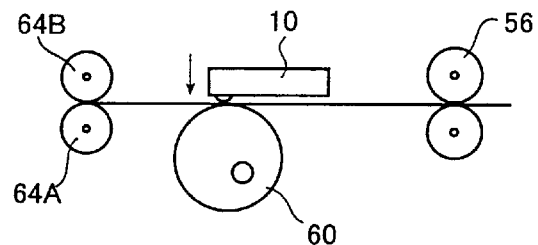

FIG. 7A shows the state in which the color paper B is transported to the recording section 20 by the transport roller pair 56, the guide 58 and the like. When the color paper B reached the image recording start position, as shown in FIG. 7B, the thermal head 10 is pressed against the platen roller 60 to complete the preparation for the image recording process.

Figure 7C:
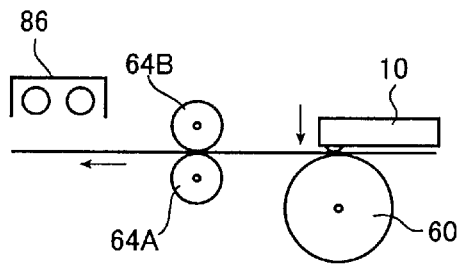
Figure 7D:
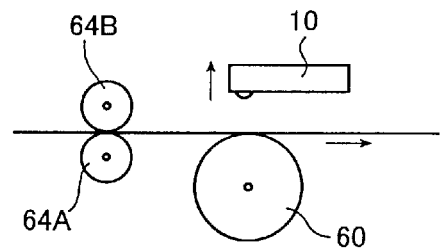

Subsequently, as shown in FIG. 7C, the optically fixing process and the image recording process for the first layer (in this case, yellow) are performed while the color paper B is transported in the downstream direction by the transport roller pair 64, particularly by the capstan roller 64A. As shown in FIG. 7D, the color paper B that has been subjected to the image recording process and the optically fixing process for the first layer is transported in the upstream direction by the capstan roller 64A and is set at the image recording process and optically fixing process start position for the second layer (in this case, magenta). In this case, the thermal head 10 is retracted to a position away from the platen roller 60.

Subsequently, the image recording process and the optically fixing process of the second layer (magenta) are performed. The operation therefor is the same as that of the image recording process and the optically fixing process for the first layer (yellow). When the image recording process and the optically fixing process for the second layer (magenta) have been completed, the color paper B is again transported in the upstream direction and set at the image recording process start position for the third layer (cyan). This operation is the same as that described above.

Figure 7E:
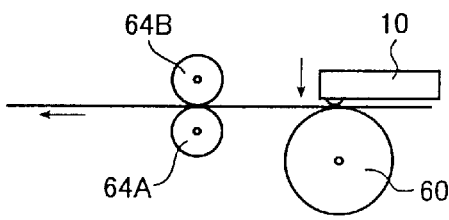
Figure 7F:
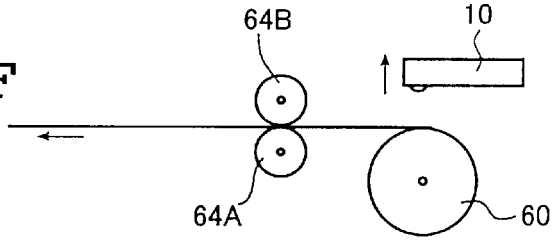

Subsequently, the image recording process for the third layer (cyan) is performed (see FIG. 7E). When this image recording process has been completed, as shown in FIG. 7F, the thermal head 10 is retracted to a position away from the platen roller 60 and the color paper B that has been subjected to the image recording process is transported by the transport roller pair 64 of the capstan roller 64A and the pressure roller 64B and discharged to the tray 72 of the discharge section 22 while being guided by the guide 62.

The image recording process onto the color paper B has been thus far described.

Figure 8A:
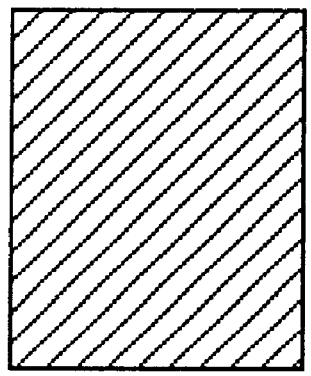
FIGS. 8A and 8B are views showing an example of the recorded image obtained by the thermal printer shown in FIG. 1, respectively.
Figure 8B:
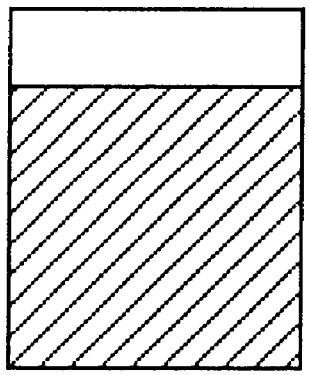

Examples of the recorded image obtained by the thermal printer in accordance with the foregoing embodiment will now be described. FIGS. 8A and 8B are views schematically showing the recorded image on the monochromatic film A and the color paper B obtained by the thermal printer in accordance with the embodiment, respectively. Incidentally, in the drawings, a hatched part denotes a portion where the image is recorded and a blank part denotes a non-recorded region.

Since the recording process is started from the state shown in FIG. 6B for the monochromic film A, the non-recorded region in the leading head portion in the conventional manner is very small as shown in FIG. 8A and the recording image may be obtained for which the entire surface of the film is effectively utilized.

If such a recorded image is used, the observer neither feels a shiny ray nor the ray hinders the reading of the shade (diagnosis).

On the other hand, in the image recording process onto the color paper B, since the recording process is started from the state shown in FIG. 7B, the non-recorded region is generated at the leading head portion as described above and as shown in FIG. 8B. Incidentally, the non-recorded region may be used for writing a variety of information related to the recorded image, for example, a name of a person who becomes a subject or ID information in an X-ray image, or a disease history or medical history. However, if the non-recorded region is awkward without any modification when unused, the non-recorded region is arranged uniformly around the periphery of the recording region.

In the foregoing embodiment, an example is shown in which the monochromic film A and the color paper B are separately received within the two magazines 24A and 24B, respectively and set in the thermal printer. However, the three loading sections 14 for the recording material may be provided and for instance, two of them may be used for the monochromic film and the rest may be used for the color paper in accordance with the amounts of processes. In this case, the utility of the thermal printer is further enhanced.

Incidentally, in the case where a plurality of loading sections 14 for the recording material are provided, it is not always necessary to load the recording material each of which has the same size. Namely, for instance, in the case where the size of the thermal head is the half size, if the half size monochromic film is used and the A4 size color paper is used, there is no problem even if the monochromic film and the color paper are different from each other in size.

Figure 9:
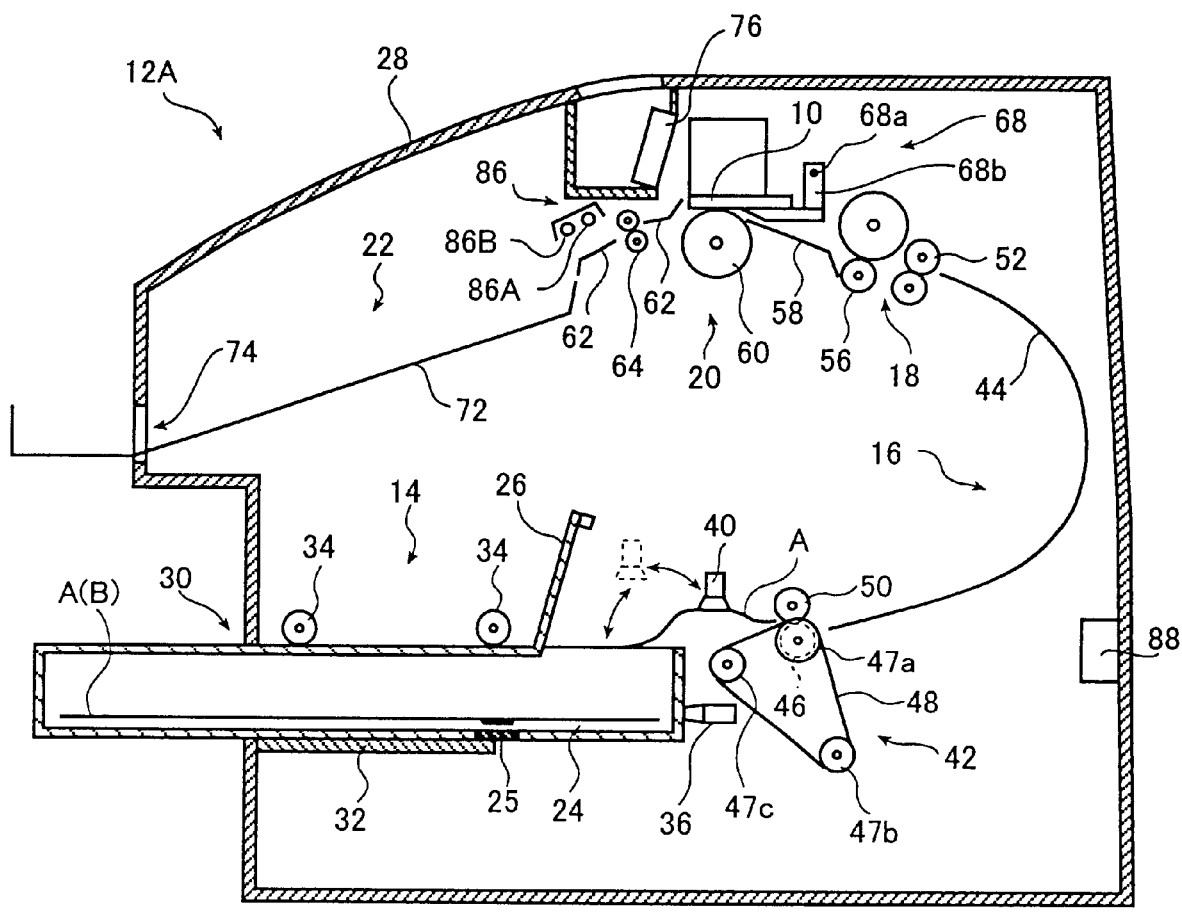
FIG. 9 is a schematic cross-sectional view showing a thermal printer in accordance with another embodiment of the invention.

A second embodiment of the present invention will now be described. In the first embodiment, the monochromic film and the color paper are separately received within the two magazines 24A and 24B, respectively, whereas in this embodiment, a single magazine 24 is used. Namely, in the thermal printer 12A in accordance with this embodiment as shown in FIG. 9, the monochromic film is set in the single magazine 24 in some case and the color paper is set in the same magazine in some case. The single magazine 24 is used commonly for the monochromic film and the color paper.

In this case, it is preferable to provide the magazine 24 with a judgment unit of a kind of the recording material disclosed in, for example, Japanese Patent Application Laid-Open Nos. Hei 1-102544, Hei 1-309053, Hei 2-83543 and the like assigned to the present assignee.

In the technology disclosed in any one of the above-noted publications, an identification mark indicating a kind of the recording material is applied to the recording material body or its wrapping material, and a judgment unit for detecting the identification mark and judging the kind is provided on the magazine 24 side.

The system is preferably used in which the identification mark is composed of a monochromic pattern for the method of detecting the above-described identification mark and is detected by the photoelectric detecting unit. For instance, in the system disclosed in Japanese Patent Application Laid-Open No. Hei 1-102544, the identification mark is composed of a single flat block of a monochromic pattern. In the system disclosed in Japanese Patent Application Laid-Open No. Hei 1-309053, the identification mark is composed of a continuous linear block of a monochromic pattern. In the system disclosed in Japanese Patent Application Laid-Open No. Hei 2-83543, the identification mark is composed, in combination, of a plurality of blocks.

By providing the magazine 24 with such a judgment unit 25, in the thermal printer 12A in accordance with the embodiment shown in FIG. 9, the kind of the recording material set in the magazine 24 is judged by the above-described judgment unit 25 and the image recording process is carried out in conformity with the kind of the judged recording material.

Namely, in the case where it is judged that the recording material set in the magazine 24 is the monochromic film A, the monochromic image recording is performed on the monochromic film through the direct recording process by the thermal head 10, whereas in the case where it is judged that the recording material set in the magazine 24 is the color paper B, the color image recording is performed on the color paper through the direct recording process by the thermal head 10.

As a matter of course, in the thermal printer 12 provided with the two magazines 24A and 24B shown in FIG. 1, it is possible to provide the judgment unit for the kind of the recording material in the same manner as in the thermal printer 12A to judge the kind of the thermal recording material loaded in each magazine and to select the thermal recording material corresponding to the kind (monochromic image or color image) of the image recording process.

Also, in the foregoing embodiments, it is determined in advance whether to effect the monochromic image recording or the color image recording in the thermal printer 12 or 12A. Also, the case where the input image data is set as to whether to effect the monochromic image data for recording the monochromic image or the color image data for recording the color image has been described. However, the present invention is not limited thereto. It is possible to identify the switching-over operation between the monochromic image recording or the color image recording in accordance with the input image data per se in the case where the input image data has the identification information, or to identify the operation in accordance with the channel from which the input image data is inputted in the case where a plurality of input channels are provided, or for the operator to designate the identification from the outside.

Figure 10A:
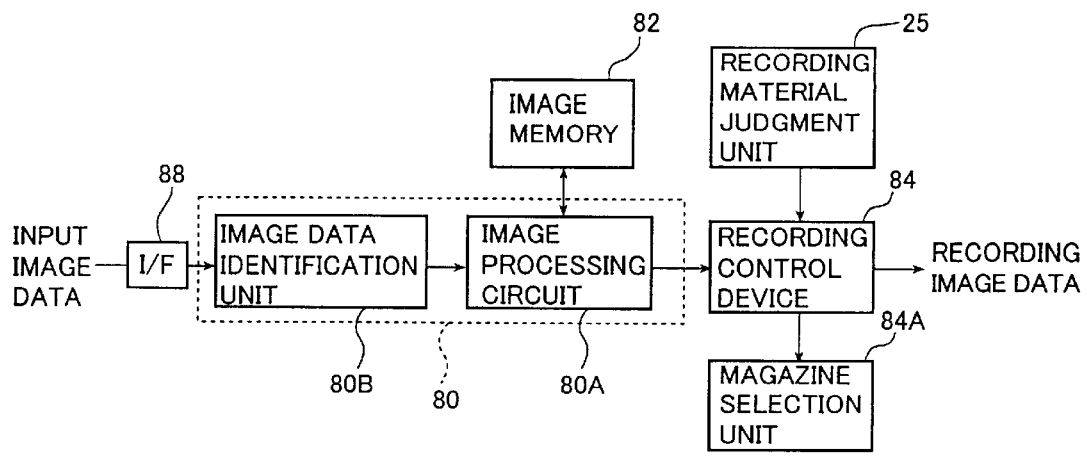
FIGS. 10A to 10C are block diagrams showing schematic structure of another example of a recording control system for a thermal head of a thermal printer in accordance with the invention, respectively.

For instance, in the recording control system of the thermal head 10 as shown in FIG. 10A, the image processing device 80 is composed of at least an image processing circuit 80A for performing the above-described various image processes and image data identification unit 80B for identifying a kind of the image data (whether the monochromic image data or the color image data), and the information of the kind of the image (data) identified by the image data identification unit 80B is fed to the recording control device 84 together with the image data that has been image processed in the image processing circuit 80A. The recording control device 84 switches over the kinds of the image recording in accordance with the identified image kind (whether the monochromic image recording or the color image recording). In this case, since the recording control device 84 is subjected to the kind of the recording material loaded in the magazine 24 (24A and 24B) from the recording material kind identification unit 25, the control device may select the magazine in accordance with the kind of the image recording to select the suitable recording material. Incidentally, in the case where the magazine that loads the suitable recording material in accordance with the kind of the image recording is not present, it is possible to display an alarm to indicate this on the display device (not shown) or to generate an alarm sound.

Figure 11A:
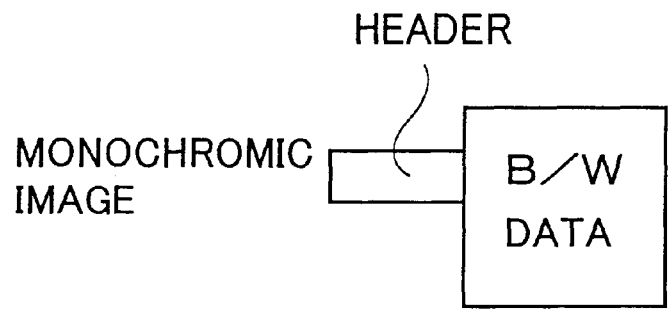
FIGS. 11A and 11B are illustrations of an example of monochromic and color image data to be inputted into the recording control system shown in FIG. 10A, respectively.
Figure 11B:
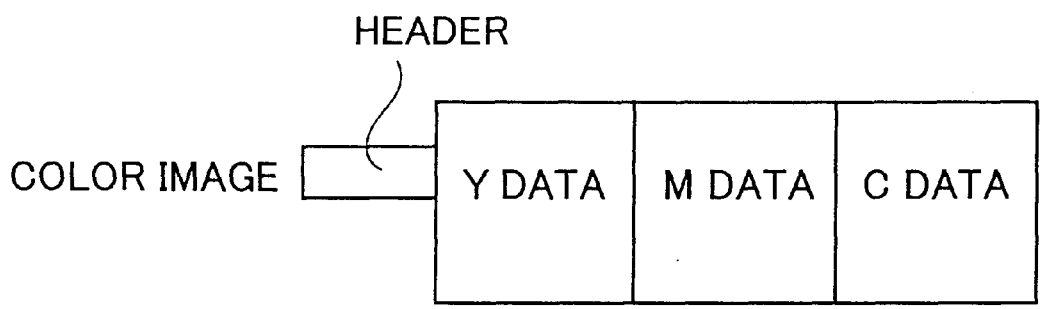

An image data having a header as shown in FIGS. 11A and 11B may be exemplified as the image data with which the kind of the image data may be identified by such an image data identification unit 80B. It is sufficient that the information (identification signal or identification data) representative of the monochromic image is written in the header of the monochromic (B/W) data shown in FIG. 11A and the color image data is composed of yellow (Y) data, magenta (M) data and cyan (C) data following the header in which the information (identification signal or identification data) representative of the color image is written. Such image data are produced on the external device (modality) side and fed from the external device to the thermal printers 12, 12A or the like.

Incidentally, such an identification signal or the identification data is not limited to that written in the header of the image data but may be in any kind of forms, in combination or separately if they are related to the image data.

Figure 10B:
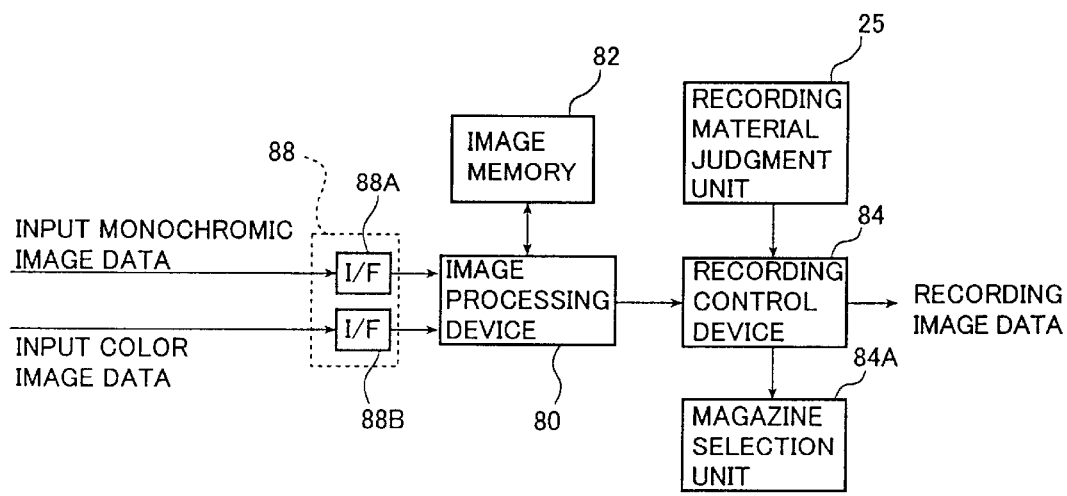
Figure 10C:
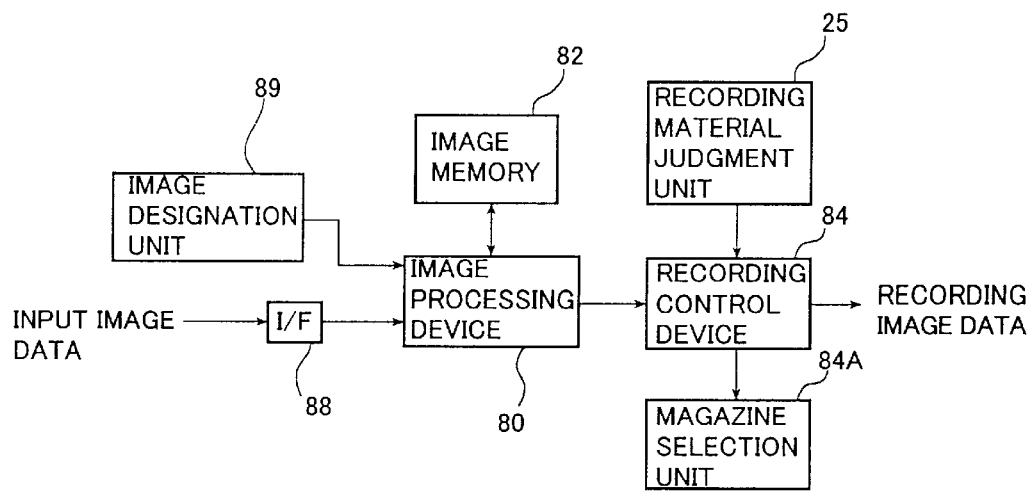

Also, since the recording control system of the thermal head 10 shown in FIGS. 10B and 10C has the same structure as the recording control system shown in FIG. 10A except for the structure of the image processing device 80 and its input system, the same reference numerals are used to indicate the like components and their explanation will be omitted.

Figure 12:
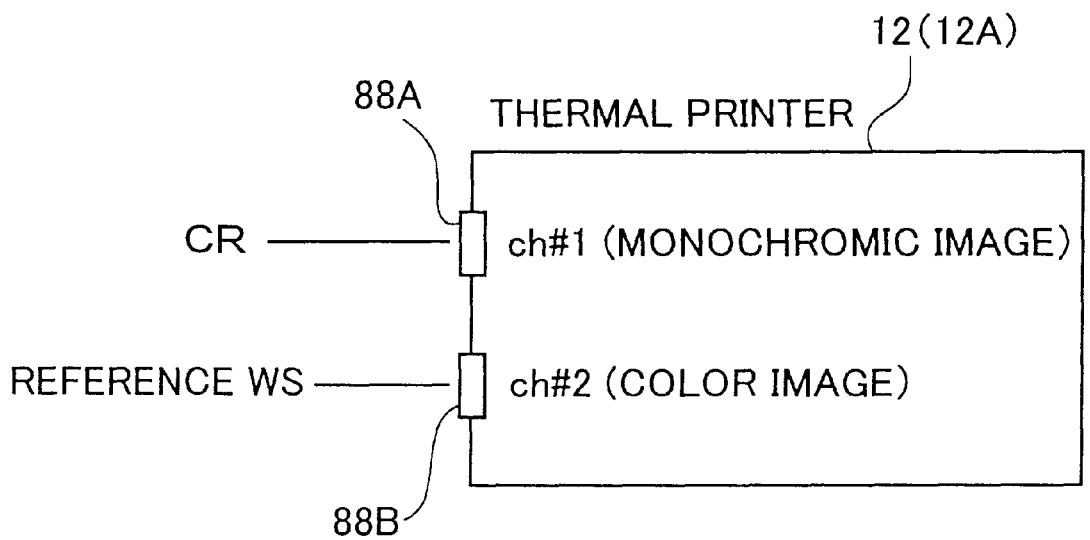
FIG. 12 is an illustration showing an example of structure of an input channel of the thermal printer to which the recording control system shown in FIG. 10B is applied.

As in the recording control system shown in FIG. 10B, two input interfaces 88A and 88B are directly connected to the image processing device 80 so that the kind of image data determined in accordance with the input channel (whether monochromic image data or color image data) is inputted into the device 80. For instance, as shown in FIG. 12, a first channel (ch#1) of two channel inputs of the thermal printer 12 or 12A is connected to a CR (computed radiography) device through the I/F 88A for dedication to the monochromic image data channel, and a second channel (ch#2) is connected to a reference WS (reference work station) through the I/F 88B for dedication to the color image data channel. The number of the channels is not limited to two but may be three or more and the method of connection is not limited to a specific one.

A designation unit 89 for designating the image kind as to whether the image recorded by the operator from the outside is the monochromic image or the color image as in the recording controlling system shown in FIG. 10C is provided so that the image kind designated by the operator may be inputted from the designation unit 89 to the image processing device 80. In this case, as a matter of course, the image data (whether the monochromic image data or the color image data) whose image kind has been designated is inputted into the image processing device 80 through the I/F 88.

Incidentally, in the above-described embodiment, an example is shown in which the color image recording process when the color image is obtained, the color generation processing of three colors and the optically fixing process in the meantime are performed in accordance with the system in which the color paper is fed forwardly or in reverse. However, the thermal printer in accordance with the present invention is not limited to this system. As a matter of course, it is possible to take a form of a rotary drum type thermal printer as disclosed in, for example, Japanese Patent Application Laid-Open Nos. Hei 5-16400 and Hei 6-270443.

Also, in the foregoing embodiment, the monochromic film A and the color paper B are exemplified as the thermal recording material but it goes without saying that it is possible to use the monochromic reflective paper and the color transparent film or the like in addition to those. The kind of the color thermal recording material is not limited to those shown in the above-described embodiment but it is possible to apply a variety of kinds of color thermal recording material.

Furthermore, in the foregoing embodiment, an example is exemplified as the thermal recording material transport unit within the recording section 20 of the thermal printer 12 in which the transport roller pair 64 that rotates in synchronization with the platen roller 60 is used. However, it goes without saying that, instead thereof, a capstan roller (64A: See FIG. 3) that is rotated and controlled separately from the platen roller 60 may be used.

Furthermore, the judgment system of the judgment unit of the kind of the recording material provided in the loading section 14 for the recording material is not limited to the above-described photoelectric reflective optical detection system. It goes without say that it is possible to use any one of various detection systems such as a photoelectric transparent optical detection system, a magnetic detection system and a system for detecting an electrostatic capacity.

As described above, the thermal printer according to the present invention has been described in detail with respect to the various embodiments. However, it goes without saying that the present invention is not limited to these embodiments but various improvements and modifications in design may be carried out in a range without departing from the scope of the present invention.

As described above in detail, according to the first embodiment of the present invention, it is possible to provide a thermal printer that may output a monochromic image and a color image without any troublesome operation such as replacing and loading/unloading ink ribbons.

In particular, in the thermal printer in accordance with the present invention provided with the thermal recording material for performing the recording process with colors in the direct recording system in the same manner as in the thermal recording material for performing the recording with the monochromic manner in the direct recording system, the distinction between the monochromic manner and the color manner of the recorded image may be identified or designated so that the image recording process may be effected on the corresponding thermal recording material to thereby ensure the above-described excellent effects.

In the thermal printer in accordance with the present invention provided with the recording material feeding section for feeding the monochromic thermal recording material and the recording material feeding section for feeding the color thermal recording material and/or the recording material feeding section for feeding the thermal recording material and the judgment unit for judging the thermal recording material to be fed, the distinction between the monochrome and the color of the recorded image is identified or designated so that the corresponding thermal recording material may be fed suitably and the image may be recorded thereon to thereby ensure the above-described excellent effects.

Also, in the system in which the pressure of the thermal head for depressing the thermal recording material in accordance with a kind of the thermal recording material on which the data are to be recorded, it is possible to prevent the disadvantages such as degradation of the image quality such as fog or flaw in the recorded image or a curl in the thermal recording material on which the data have been recorded.

As has been described above, in accordance with the second embodiment of the present invention, the thermal printer may be realized in which the thermal recording material transport units are changed for the case where the monochromic image is to be obtained and the case where the color image is to be obtained so that the generation of the portion where the non-recorded region is generated in case of the monochromic image may be reduced as much as possible.

More specifically, in the thermal printer in accordance with the present invention, the transport unit of the monochromic thermal recording material and the transport unit of the color thermal recording material are provided separately from each other and are selectively used, so that the generation of the non-recorded portion where the recording process is not effected or the non-recorded region (which finally becomes a blank portion in the final image) generated in the case where the image recording process is effected onto the monochromic thermal recording material by using the transport unit for the color thermal recording material may be prevented.

Also, the distinction between the monochrome and color of the recorded image is identified or designated so that the image recording process may be performed on the corresponding thermal recording material out of the thermal recording material for recording the data in the monochromic manner and the thermal recording material for recording the data in the colorful manner to thereby ensure the above-described excellent effects.

What is claimed is:

1. A thermal printer comprising:
   a thermal recording head for recording an image in contact with thermal recording material at a predetermined pressure, said thermal recording head recording a monochromic image and a color image in a direct thermal recording system;
   a plurality of kinds of thermal recording material transport units for transporting said thermal recording material during thermal recording, wherein different units are used among said plurality of kinds of thermal recording material transport units when said monochromic image is recorded and when said color image is recorded; and
   a platen roller that is arranged to face the thermal recording head and supports said thermal recording material that becomes and object to be recorded.

2. The thermal printer according to claim 1, wherein said thermal recording material includes monochromic thermal recording material f or recording said monochromic image and color thermal recording material for recording said color image and said thermal recording head records said monochromic image onto said monochromic recording material and said color image onto said color thermal recording material, respectively.

3. The thermal printer according to claim 1, further comprising:
   a recording material feeding section for feeding said thermal recording material; and
   a judgment unit provided in said recording material feeding section for judging whether said thermal recording material is monochromic thermal recording material for recording said monochromic image or color thermal recording material for recording said color image.

4. The thermal printer according to claim 1, further comprising: at least two recording material feeding sections of:
   a first recording material feeding section for feeding monochromic thermal recording material for recording said monochromic image; and
   a second recording material feeding section for feeding color thermal recording material for recording said color image.

5. The thermal printer according to claim 1, wherein said monochromic image is recorded on a transparent recording medium that is monochromic thermal recording material and said color image is recorded on a reflective recording medium that is color thermal recording material.

6. The thermal printer according to claim 1, wherein a head pressure for depressing said thermal recording material at the predetermined pressure is changed by said thermal recording head when said monochromic image is recorded and when the color image is recorded.

7. The thermal printer according to claim 1, further comprising:
   an identification unit for identifying designated information from an external device for designating distinction as to whether said image to be recorded is the monochromic image or the color image.

8. The thermal printer according to claim 1, further comprising:
   a designation unit for designating distinction as to whether said image to be recorded is the monochromic image or the color image.

9. The thermal printer according to claim 1, wherein said thermal recording material comprises monochromic thermal recording material including a heat responsible microcapsule in a color forming layer.

10. The thermal printer according to claim 1, wherein said monochromic image and the color image are medical inspection images.

11. The thermal printer according to claim 1, wherein one of said plurality of kinds of thermal recording material transport units is said platen roller which is used when said monochromatic image is recorded and another is a capstan roller which is used when a color image is recorded.

12. A thermal printer comprising:
   a thermal recording head for recording an image in contact with thermal recording material at a predetermined pressure; and
   a platen roller that is arranged to face the thermal recording head and supports the thermal recording material that becomes an object to be recorded; wherein
      a head pressure of said thermal recording head for depressing said thermal recording material at the predetermined pressure is changed in accordance with a kind of said thermal recording material, and
   wherein said thermal recording material includes monochromic thermal recording material for recording said monochromic image and color thermal recording material for recording said color image and said thermal recording head records said monochromic image onto said monochromic recording material and said color image onto said color thermal recording material, respectively.

13. The thermal printer according to claim 12, wherein said thermal recording head is configured and arranged directly to record an image onto said thermal recording material.

14. A thermal printer comprising:
   a thermal recording head for recording a monochromatic image and a color image in contact with thermal recording material at a predetermined pressure; and
   a plurality of kinds of thermal recording material transport units for transporting said thermal recording material; wherein
      different units are used among said plurality of kinds of thermal recording material transport units when said monochromic image is recorded and when said color image is recorded.

15. The thermal printer according to claim 14, wherein one of said plurality of kinds of thermal recording material transport units is disposed to face said thermal recording head and is a platen roller for supporting said thermal recording material that becomes an object to be recorded, and the other is a capstan roller disposed behind said thermal recording head and said platen roller.

16. The thermal printer according to claim 14, wherein a head pressure for depressing said thermal recording material at the predetermined pressure is changed by said thermal recording head when said monochromic image is recorded and when said color image is recorded.

17. The thermal printer according to claim 14, further comprising:
   an identification unit for identifying designated information from an external device for designating distinction as to whether said image to be recorded is said monochromic image or said color image.

18. The thermal printer according to claim 14, further comprising:
   a designation unit for designating distinction as to whether said image to be recorded is said monochromic image or said color image.

19. The thermal printer according to claim 14, wherein said monochromic image and said color image are medical inspection images.

20. The thermal printer according to claim 14, wherein said thermal recording head is configured and arranged directly to record an image onto said thermal recording material.

* * * * *